(12) United States Patent
Ito et al.

(10) Patent No.: US 11,249,768 B2
(45) Date of Patent: Feb. 15, 2022

(54) COMMUNICATION DEVICE, SERVER, COMMUNICATION SYSTEM, COMMUNICATION METHOD, AND PROGRAM

(71) Applicant: Mitsubishi Electric Corporation, Tokyo (JP)

(72) Inventors: Takahiro Ito, Tokyo (JP); Taichi Ishizaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 208 days.

(21) Appl. No.: 16/479,980

(22) PCT Filed: Mar. 13, 2017

(86) PCT No.: PCT/JP2017/009974
§ 371 (c)(1),
(2) Date: Jul. 23, 2019

(87) PCT Pub. No.: WO2018/167821
PCT Pub. Date: Sep. 20, 2018

(65) Prior Publication Data
US 2019/0391819 A1  Dec. 26, 2019

(51) Int. Cl.
*G06F 15/177* (2006.01)
*G06F 9/445* (2018.01)
(Continued)

(52) U.S. Cl.
CPC ............ *G06F 9/445* (2013.01); *H04L 67/303* (2013.01); *H04L 67/306* (2013.01); *H04W 76/11* (2018.02)

(58) Field of Classification Search
CPC ...... G06F 9/445; H04W 76/11; H04L 67/303; H04L 67/306
(Continued)

(56) References Cited

U.S. PATENT DOCUMENTS

2003/0200285 A1  10/2003  Hansen et al.
2006/0146812 A1   7/2006  Farr et al.
(Continued)

FOREIGN PATENT DOCUMENTS

JP  2014-078773 A   5/2014
WO  2012/093696 A1  7/2012
(Continued)

OTHER PUBLICATIONS

Extended European Search Report dated Jan. 28, 2020 issued in corresponding EP patent application No. 17900716.6.
(Continued)

*Primary Examiner* — Atta Khan
(74) *Attorney, Agent, or Firm* — Posz Law Group, PLC

(57) ABSTRACT

A communication device includes a first communicator, a second communicator, an identifier acquirer, an identifier transmitter, a communication program acquirer, and a communication program executor. The first communicator communicates with a device. The second communicator communicates with a server. The identifier acquirer acquires from the device via the first communicator an identifier for identifying the device. The identifier transmitter transmits to the server the identifier acquired by the identifier acquirer. The communication program acquirer acquires from the server via the second communicator the communication program associated with the identifier transmitted by the identifier transmitter. The communication program executor executes the communication program acquired by the communication program acquirer.

5 Claims, 11 Drawing Sheets

(51) Int. Cl.
*H04W 76/11* (2018.01)
*H04L 67/303* (2022.01)
*H04L 67/306* (2022.01)

(58) Field of Classification Search
USPC .......................................................... 713/2
See application file for complete search history.

(56) References Cited

U.S. PATENT DOCUMENTS

| | | | |
|---|---|---|---|
| 2013/0013793 A1* | 1/2013 | Sanchez Herrero | H04L 67/12 709/227 |
| 2014/0016003 A1 | 1/2014 | Oizumi | |
| 2014/0089478 A1* | 3/2014 | Seed | H04W 4/70 709/222 |
| 2014/0244710 A1* | 8/2014 | Sharma | H04L 69/24 709/201 |
| 2014/0359131 A1* | 12/2014 | Seed | H04L 67/1031 709/226 |
| 2015/0065111 A1 | 3/2015 | Kobayashi | |
| 2016/0212571 A1* | 7/2016 | Choi | H04L 61/6004 |
| 2017/0237815 A1* | 8/2017 | Arsenault | H04L 12/4633 709/217 |
| 2018/0314808 A1* | 11/2018 | Casey | G06F 21/105 |

FOREIGN PATENT DOCUMENTS

| | | |
|---|---|---|
| WO | 2012/160861 A1 | 11/2012 |
| WO | 2013/146083 A1 | 10/2013 |

OTHER PUBLICATIONS

Office Action dated Dec. 22, 2020 issued in corresponding EP patent application No. 17900716.6.
European Office Action dated Apr. 15, 2020 issued in corresponding EP patent application No. 17900716.6.
International Search Report dated May 16, 2017 issued in the corresponding International Application No. PCT/JP2017/009974 (and English translation).

* cited by examiner

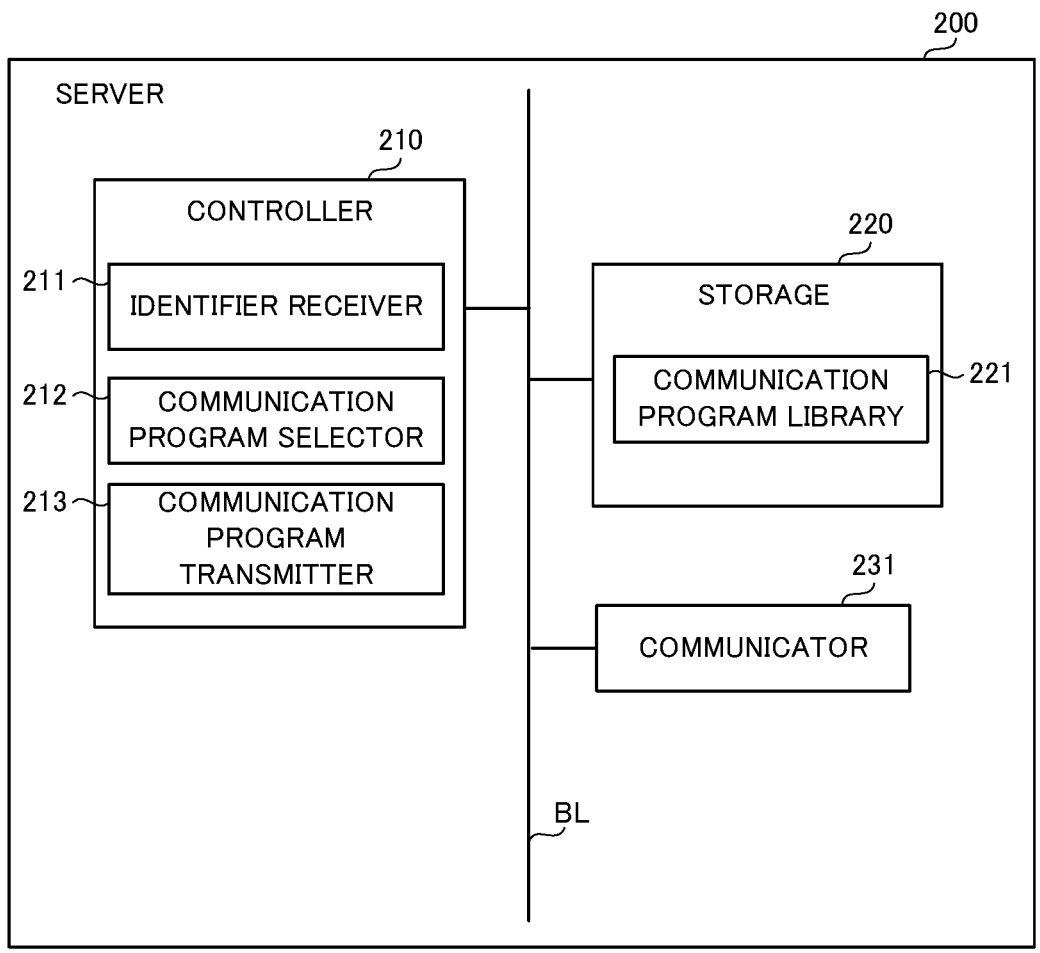

| IDENTIFIER | DEVICE TYPE | INSTALLATION SITE | CONTENT OF CONTRACT | ... |
|---|---|---|---|---|
| 100-0001 | AC CONTROLLER A | ○○ BUILDING | STANDARD PLAN | ... |
| 101-0003 | AC CONTROLLER B | △△ OFFICE | DISCOUNT PLAN | ... |
| 200-0004 | LTG CONTROLLER A | □□ HALL | STANDARD PLAN | ... |
| ⋮ | ⋮ | ⋮ | ⋮ | ⋮ |

| DEVICE TYPE | COMMUNICATION PROGRAM |
|---|---|
| AC CONTROLLER A | AC A |
| AC CONTROLLER B | AC B |
| LTG CONTROLLER A | LTG A |
| ⋮ | ⋮ |

COMMUNICATION PROGRAM LIBRARY

| IDENTIFIER | CONTENT OF CONTRACT | DEVICE TYPE | INSTALLATION SITE | ... |
|---|---|---|---|---|
| 100-0001 | AC STANDARD PLAN | AC CONTROLLER A | ○○ BUILDING | ... |
| 101-0003 | AC DISCOUNT PLAN | AC CONTROLLER B | △△ OFFICE | ... |
| 200-0004 | LTG STANDARD PLAN | LTG CONTROLLER A | □□ HALL | ... |
| ⋮ | ⋮ | ⋮ | ⋮ | ⋮ |

| CONTENT OF CONTRACT | COMMUNICATION PROGRAM |
|---|---|
| AC STANDARD PLAN | AC STANDARD |
| AC DISCOUNT PLAN | AC DISCOUNT |
| LTG STANDARD PLAN | LTG STANDARD |
| ⋮ | ⋮ |

COMMUNICATION PROGRAM LIBRARY

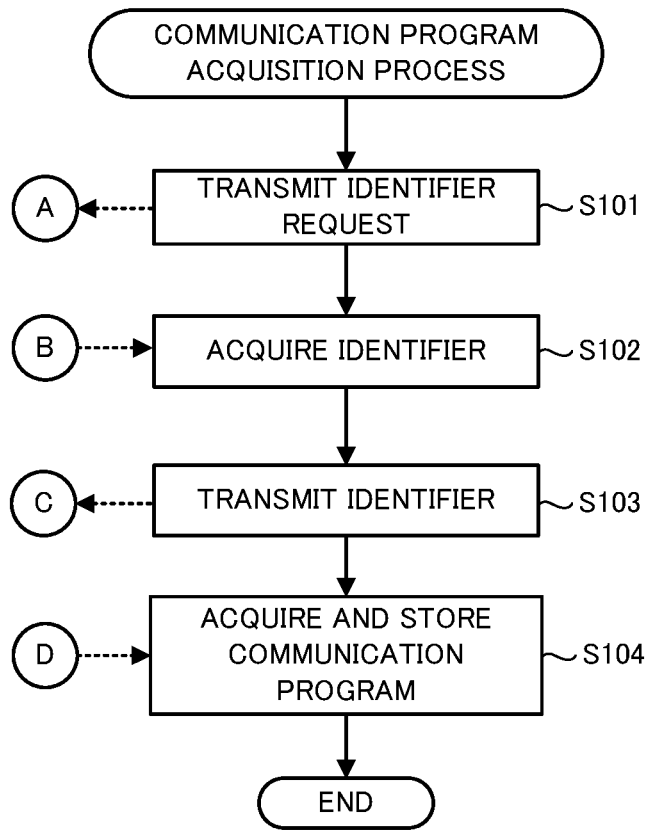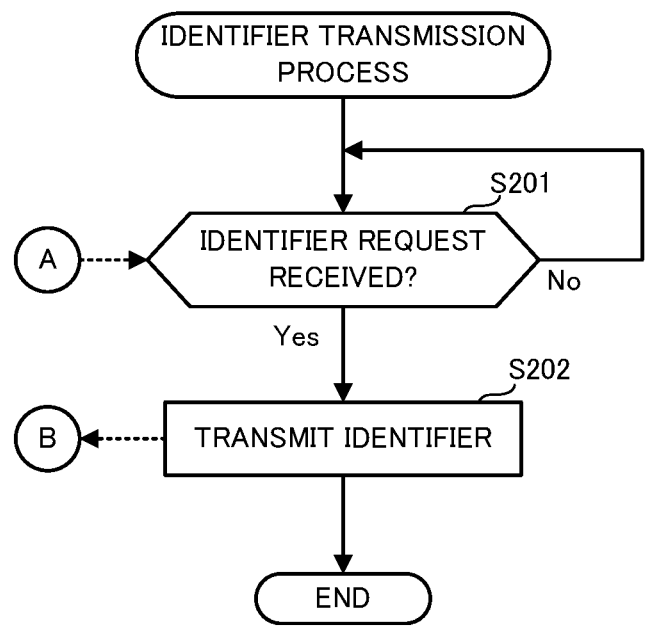

COMMUNICATION DEVICE, SERVER, COMMUNICATION SYSTEM, COMMUNICATION METHOD, AND PROGRAM

CROSS REFERENCE TO RELATED APPLICATION

This application is a U.S. national stage application of PCT/JP2017/009974 filed on Mar. 13, 2017, the contents of which are incorporated herein by reference.

TECHNICAL FIELD

The present disclosure relates to a communication device, a server, a communication system, a communication method, and a program.

BACKGROUND ART

A system for uploading information of various devices to a server on the Internet is known. For example, Patent Literature 1 describes a data management system that includes a device, a server, and a boarder router placed between the device and the server to achieve uploading of information of the device to the server via the boarder router even when address information of the server is not registered in the device.

CITATION LIST

Patent Literature

Patent Literature 1: Unexamined Japanese Patent Application Kokai Publication No. 2014-78773

SUMMARY OF INVENTION

Technical Problem

The data management system described in Patent Literature 1 downloads to the boarder router a communication program including the address information of the server in advance before start of communication. The data management system can achieve uploading of information of individual devices to the server by the boarder router relaying the information to the server based on the address information included in the downloaded communication program even when the address information of the server is not registered in the individual devices. This system, however, requires a user to manage what program is to be downloaded to the boarder router as the communication program. The communication program needs to be changed in accordance with procedures of communication with various types of connection targets, types of information to be acquired, and timings of acquisition of information. The communication procedures and the types and acquisition timings of the information vary for different types of connection targets. The increased number of the types of connection targets thus increases user effort to change the communication program to adapt the communication device to the connection target.

In consideration of the aforementioned circumstances, an objective of the present disclosure is to provide a communication device, a server, a communication system, a communication method, and a program that can reduce effort to change communication programs even for increased number of the types of connection targets.

Solution to Problem

To achieve the above objective, a communication device according to the present disclosure includes first communication means for communicating with a device, second communication means for communicating with a server, identifier acquisition means for acquiring from the device via the first communication means an identifier for identifying the device, communication program acquisition means for acquiring from the server via the second communication means a communication program associated with the identifier acquired by the identifier acquisition means, and communication program execution means for executing the communication program acquired by the communication program acquisition means.

Advantageous Effects of Invention

According to the present disclosure, the communication device acquires the communication program adapted to a device connected to the communication device, thereby reducing effort to change the communication programs even for increased number of the types of connection targets.

BRIEF DESCRIPTION OF DRAWINGS

FIG. 3 is a functional block diagram of a server according to Embodiment 1;

FIG. 4 is a diagram illustrating an example of data stored in a communication program library according to Embodiment 1;

FIG. 5 is a diagram illustrating another example of data stored in the communication program library according to Embodiment 1;

FIG. 6 is a diagram illustrating yet another example of data stored in the communication program library according to Embodiment 1;

FIG. 8 is a flowchart of a communication program acquisition process by the communication device according to Embodiment 1;

FIG. 9 is a flowchart of an identifier transmission process by the facility management device according to Embodiment 1;

DESCRIPTION OF EMBODIMENTS

A communication device, a server, a communication system, a communication method, and a program according to embodiments of the present disclosure are described in detail with reference to the drawings. The same or equivalent components are designated by the same reference signs through the drawings.

Embodiment 1

Figure 1:
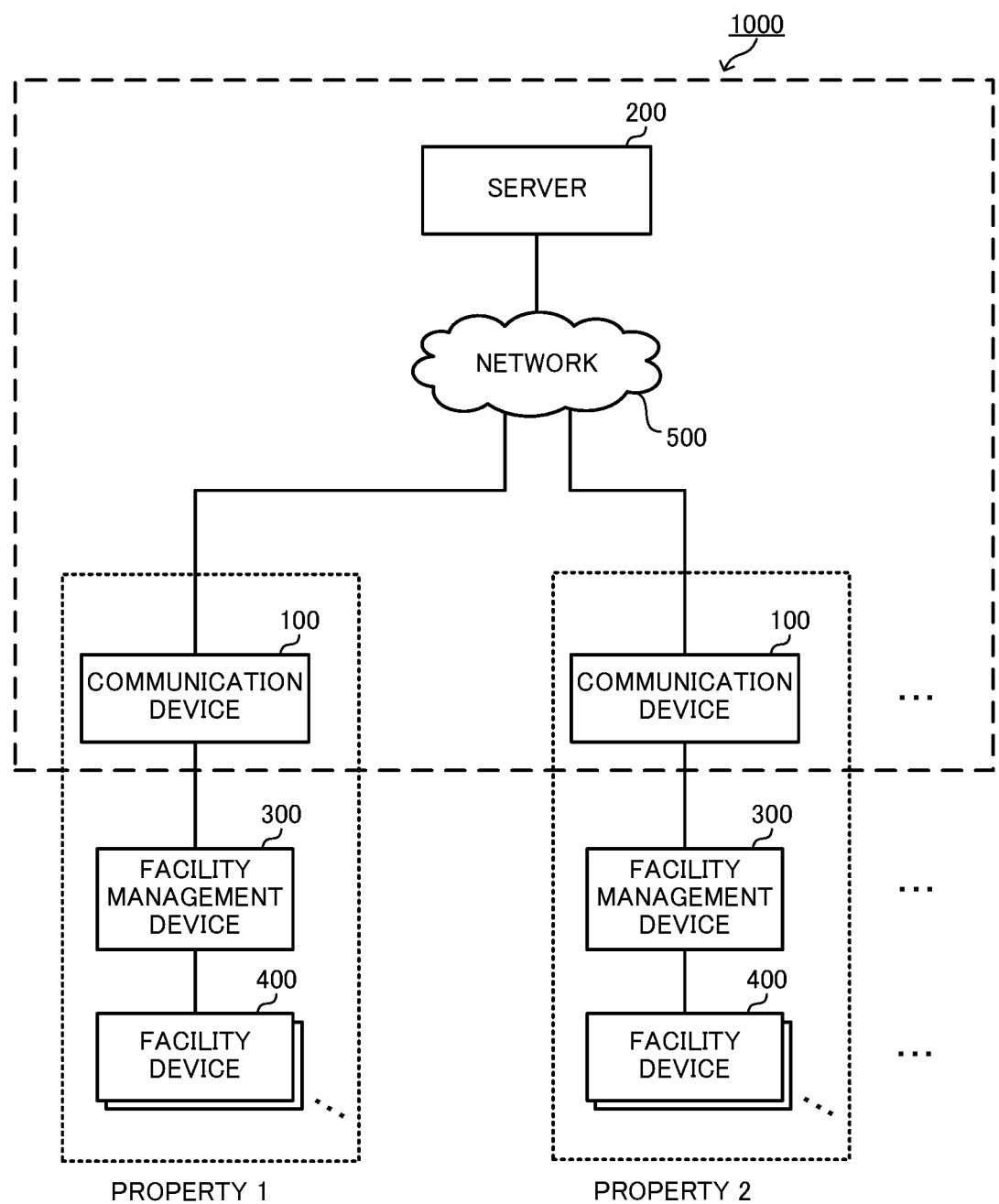
FIG. 1 is a diagram illustrating an example system configuration of a communication system according to Embodiment 1 of the present disclosure.

A communication system 1000 according to Embodiment 1 of the present disclosure includes a communication device 100 and a server 200, as illustrated in FIG. 1. The communication device 100 and the server 200 can be communicated with each other via a network 500. The network 500 used may be any network including a Long Term Evolution (LTE (registered trademark)) network and a wireless local area network (LAN). The Internet is used herein as the network 500.

The communication device 100 is communicatively connected to a facility management device 300, typically on a property basis. The facility management device 300 is in turn communicatively connected to one or more facility devices 400. The term "property" as used herein means a building and land where a device that collects information is installed. Examples of the property include an office building, a factory, a warehouse, an apartment house, a house, and a park. The facility devices 400 can be any types of devices that are installed in the property. Examples of the facility devices 400 include an air conditioner, lighting equipment, and anti-theft and disaster prevention equipment. The facility management device 300 is a device that monitors, controls, and manages the facility devices 400. The facility management device 300 can, for example, control the connected facility devices 400 collectively or individually. The facility management device 300 can also acquire various types of information from the connected facility devices 400.

The communication device 100 can receive the information acquired by the facility management device 300 from the facility devices 400. The communication procedure in the communication and the types of communication data and the timings of communication, however, may vary for different types of facility management devices 300 because types and amounts of data and timings of communication vary depending on the types and the number of the facility devices 400 connected to each facility management device 300. To accommodate the variations, the communication device 100 downloads a communication program adapted to the connected facility management device 300 and then executes the downloaded communication program. Taking such a step enables the communication device 100 to appropriately receive various types of information acquired by the connected facility management device 300 from the facility devices 400 and upload the received information to the server 200.

As briefly described above, in the communication system 1000, the communication device 100 downloads and executes the communication program adapted to each facility management device 300 that manages the facility devices 400. This enables the communication device 100 to be fitted for various types of facility management devices 300 and upload to the server 200 various types of information acquired from various facility devices 400. For explanation on how to achieve such a system, a configuration of each device is first described below.

Figure 2:
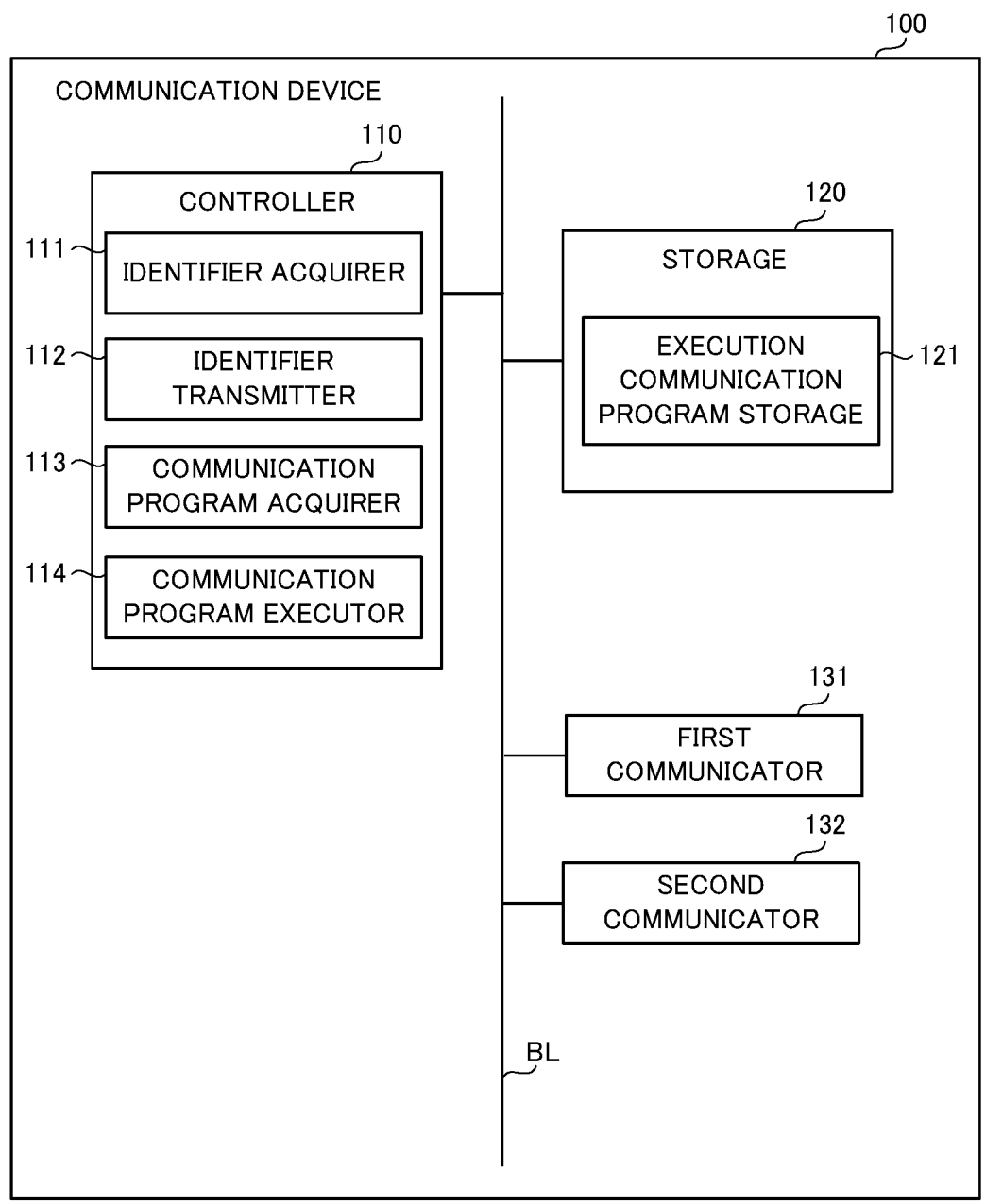
FIG. 2 is a functional block diagram of a communication device according to Embodiment 1.

As illustrated in FIG. 2, the communication device 100 includes, as functional components, a controller 110, a storage 120, a first communicator 131, and a second communicator 132, all of which are electrically connected to one another via a bus line BL.

The controller 110 includes a central processing unit (CPU), and executes programs stored in the storage 120, thereby implementing functions of components (an identifier acquirer 111, an identifier transmitter 112, a communication program acquirer 113, and a communication program executor 114).

The identifier acquirer 111 acquires an identifier from the facility management device 300 via the first communicator 131. The identifier is for identifying the facility management device 300, which is described in detail later. The identifier acquirer 111 functions as identifier acquisition means.

The identifier transmitter 112 transmits the identifier acquired by the identifier acquirer 111 to the server 200 via the second communicator 132. The identifier transmitter 112 functions as identifier transmission means.

The communication program acquirer 113 acquires from the server 200 via the second communicator 132 a communication program adapted to the facility management device 300 that is identified with the identifier acquired by the identifier acquirer 111. The communication program acquirer 113 then stores the acquired communication program in an execution communication program storage 121 described later. That is, the communication program adapted to the facility management device 300 is downloaded by the communication program acquirer 113 to the communication device 100. The communication program is a program to be executed for relay of data to be transmitted and received between the server 200 and the facility management device 300 connected to the communication device 100. The communication program is executed by the communication program executor 114 of the communication device 100. The communication program acquirer 113 functions as communication program acquisition means.

The communication program executor 114 executes the communication program stored in the execution communication program storage 121. The execution of the communication program by the communication program executor 114 allows the communication device 100 to relay communication between the facility management device 300 and the server 200. The communication program executor 114 functions as communication program execution means.

The storage 120 includes as hardware components a read only memory (ROM) and a random access memory (RAM). The storage 120 stores a program to be executed by the controller 110, and necessary data. The storage 120 includes as a functional component an execution communication program storage 121. The storage 120 functions as storage means.

The execution communication program storage 121 stores the communication program acquired by the communication program acquirer 113. The execution communication program storage 121 functions as execution communication program storage means.

The first communicator 131 is a communication interface for communication with the facility management device 300. The first communicator 131 may be any communication interface that can establish communication with the facility management device 300. The first communicator 131 may be, for example, a communication interface compliant with wired communication standards, such as Ethernet (registered trademark), or a communication interface compliant with wireless communication standards, such as the wireless LAN or Bluetooth (registered trademark).

The first communicator 131 is not limited to only a single type of communication interface. The first communicator 131 may include multiple types of communication interfaces including, for example, an Ethernet (registered trademark) interface for communication with the first facility management device 300, a universal serial bus (USB) for communication with the second facility management device 300, and a wireless LAN interface for communication with the third facility management device 300. The first communicator 131 functions as first communication means.

The second communicator 132 is a communication interface for communication with the server 200. The second communicator 132 may be any communication interface that can establish communication with the server 200. The second communicator 132 may be, for example, a communication interface compliant with wired communication standards, such as Ethernet (registered trademark), or a communication interface compliant with wireless communication standards, such as the wireless LAN or LTE (registered trademark). The second communicator 132 functions as second communication means.

Next, a configuration of the server 200 is described. As illustrated in FIG. 3, the server 200 includes, as functional components, a controller 210, a storage 220, and a communicator 231, all of which are electrically connected to one another via a bus line BL.

The controller 210 includes a CPU, and executes programs stored in the storage 220, thereby implementing functions of components (an identifier receiver 211, a communication program selector 212, and a communication program transmitter 213) of the server 200. The controller 210 has multitasking capabilities and can execute multiple processes in parallel.

The identifier receiver 211 receives from the communication device 100 via the communicator 231 an identifier of the facility management device 300 connected to the communication device 100. The identifier receiver 211 functions as identifier reception means.

The communication program selector 212 selects from a communication program library 221 described later a communication program adapted to the facility management device 300 that is identified with the identifier received by the identifier receiver 211. The communication program selector 212 functions as communication program selection means.

The communication program transmitter 213 transmits to the communication device 100 via the communicator 231 the communication program selected by the communication program selector 212. The communication program transmitter 213 functions as communication program transmission means.

The storage 220 includes a RAM and a ROM, and stores a program to be executed by the controller 210 of the server 200, and necessary data. The storage 220 includes as a functional component the communication program library 221. The storage 220 functions as storage means.

As illustrated in FIG. 4, the communication program library 221 stores, for each identifier of the facility management device 300, the communication program adapted to the corresponding facility management device 300, with the communication program associated with the corresponding identifier. In addition to the communication program, the communication program library 221 may desirably further store reference information including a device name of the facility management device 300, an installation site, a content of contract with a customer who is a purchaser of the facility management device 300, as illustrated in FIG. 4. In response to a new customer's purchasing of the facility management device 300, the communication program adapted to the facility management device 300 purchased by the new customer is additionally stored in the communication program library 221 in association with the identifier of the purchased facility management device 300.

The entries, "AC A1", "AC B2", and "LTG A1", in a column of the communication program in FIG. 4 each refer to the communication program itself. For example, "AC A1" is a communication program adapted to the facility management device 300 that is called the air-conditioning controller A. The communication program can take any form. For example, the communication program may be a binary executable code running on an operating system (OS) of the communication device 100, a script using a programming language running on the communication device 100, or a Java (registered trademark) class file.

Here, a supplementary description of the "communication program adapted to the facility management device 300" is given. As described above, the communication procedure, the timings of communication, and the like, for use in transmission by the facility management device 300 of a collection of data received from the facility devices 400 to the communication device 100 vary for each of the connected facility devices 400. The variations are caused because different types of facility devices 400 differ in types of data used, data generation timings, amounts of data, urgency of data transmission, and the like. Thus the communication program is prepared beforehand for communication processing for each facility management device 300 at the communication procedure, the types of data, and the transmission timings that are adapted to the connected facility devices 400. This is what the "communication program adapted to the facility management device 300" means.

FIG. 4 illustrates an example of data stored in the communication program library 221 in which the communication program associated with the corresponding identifier is stored for each identifier of the facility management device 300. However, the structure of the communication program library 221 is not limited thereto. For example, when the communication program adapted to the facility management device 300 is defined based on the device name of the facility management device 300, the communication program may be stored for each device name as illustrated in FIG. 5, and the communication program selector 212 may select the communication program based on the device name associated with the identifier.

Alternatively, when the communication program adapted to the facility management device 300 is defined based on the content of contract with the customer who is a purchaser of the facility management device 300, the communication program is stored for each content of contract as illustrated in FIG. 6, and the communication program selector 212 may select the communication program based on the content of contract associated with the identifier. Alternatively, when the communication program adapted to the facility management device 300 is defined based on a combination of the device name of the facility management device 300 and the content of contract with the customer who is the purchaser of that facility management device 300, the communication program is stored for each combination of the device name and the content of contract, and the communication program selector 212 may select the communication program based on the device name and the content of contract that are associated with the identifier. Building the communication program library 221 as above can reduce burden on the capacity and management of the communication program library 221.

The communicator 231 includes a communication unit, and is a communication interface for communication with the communication device 100. This communication interface may be any communication interface that can establish communication with the communication device 100. The communicator 231 may be, for example, a communication interface compliant with wired communication standards, such as Ethernet (registered trademark), or a communication interface compliant with wireless communication standards, such as the wireless LAN or LTE (registered trademark). The communicator 231 functions as communication means.

Figure 7:
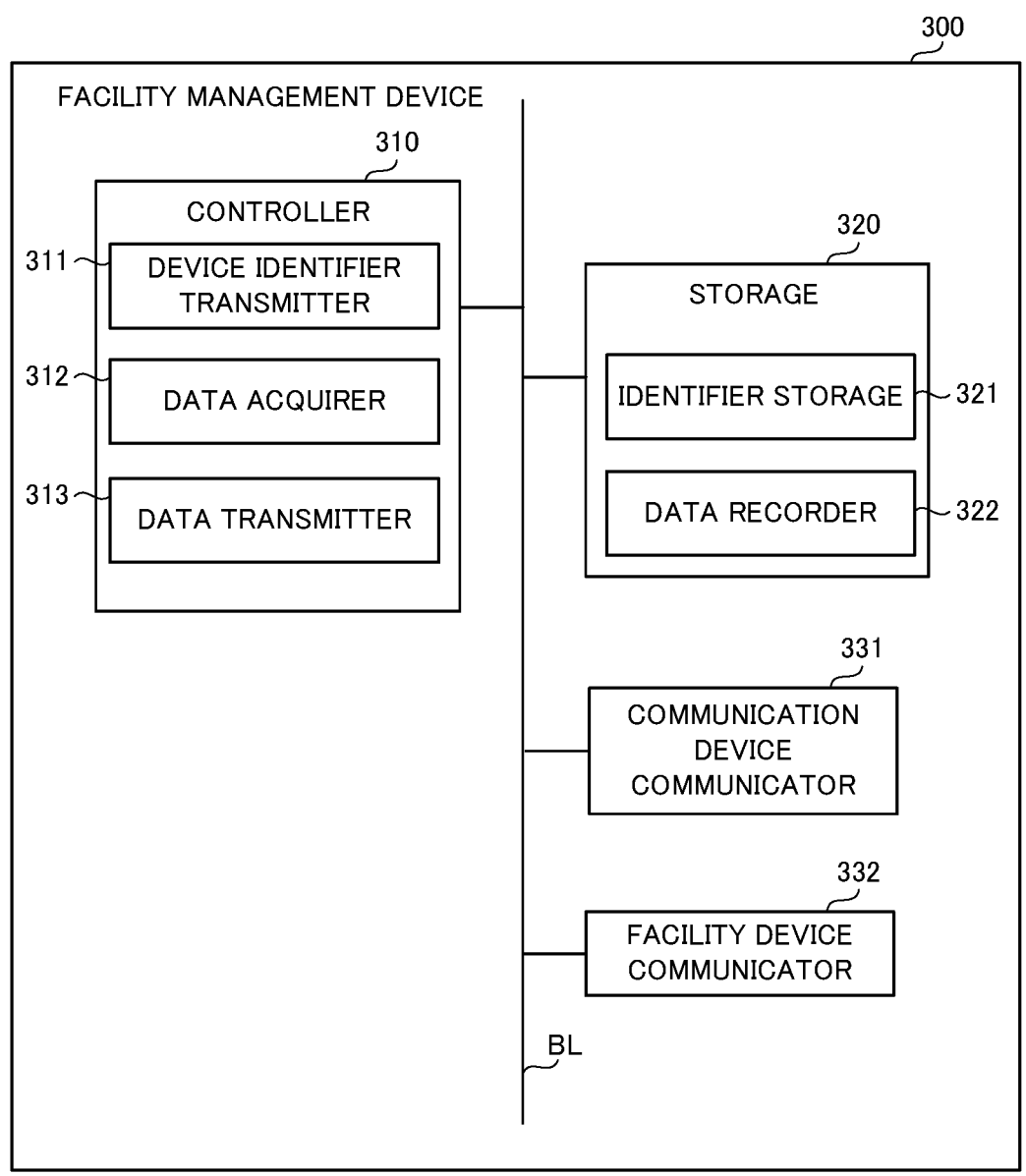
FIG. 7 is a functional block diagram of a facility management device according to Embodiment 1.

Next, a configuration of the facility management device 300 is described. The facility management device 300 is a device to be connected to the communication device 100. As illustrated in FIG. 7, the facility management device 300 includes, as functional components, a controller 310, a storage 320, a communication device communicator 331, and a facility device communicator 332, all of which are electrically connected to one another via a bus line BL.

The controller 310 includes a central processing unit (CPU), and executes programs stored in the storage 320, thereby implementing functions of components (a device identifier transmitter 311, a data acquirer 312, and a data transmitter 313). The controller 310 operates on the OS with file system and multitasking features, in which a file transfer protocol (FTP) server program or a hypertext transfer protocol (HTTP) server program runs as background tasks. Examples of the OS with the file system and multitasking features include Linux (registered trademark).

The device identifier transmitter 311 transmits to the communication device 100 via the communication device communicator 331 an identifier stored in the identifier storage 321 described later. Transmission of the identifier to the communication device 100 by the facility management device 300 allows the communication device 100 to download from the server 200 the communication program adapted to that facility management device 300. The device identifier transmitter 311 functions as device identifier transmission means.

The data acquirer 312 acquires, via the facility device communicator 332, data transmitted by the facility device 400 connected to the facility management device 300, and records the data in a data recorder 322 described later. The data acquirer 312 functions as data acquisition means.

The data transmitter 313 transmits to the communication device 100 via the communication device communicator 331 the data stored in the data recorder 322. The data transmitter 313 functions as data transmission means.

The storage 320 includes as hardware components a read only memory (ROM) and a random access memory (RAM). The storage 320 stores a program to be executed by the controller 310, and necessary data. The storage 320 includes as functional components the identifier storage 321 and the data recorder 322. The storage 320 functions as storage means.

The identifier storage 321 stores an identifier for identifying the facility management device 300. This identifier is information for identifying the facility management device 300, examples of which include, for example, a serial number and a media access control (MAC) address of the facility management device 300. Although how the identifier storage 321 is implemented can be freely selected, the identifier can be, for example, stored as text information on a file on a path that is defined as an identifier storage path. It is assumed here that the HTTP server runs on the facility management device 300 and the identifier is stored on a file on the path that is defined as the identifier storage path. The identifier storage 321 functions as identifier storage means.

Without need for unique identification of the facility management device 300 in the communication device 100 and the server 200, the device name of the facility management device 300 may be used as the identifier, for example. Such an alternative use is possible because, for example when the communication program adapted to the facility management device 300 is determined uniquely for each device type, the server 200 can select the communication program adapted to the facility management device 300 if the device name is known.

The data recorder 322 stores via the facility device communicator 332 the data acquired by the data acquirer 312 from the facility device 400. The data recorder 322 functions as data storage means.

The communication device communicator 331 is a communication interface for communication with the communication device 100. The communication device communicator 331 may be any communication interface that can establish communication with the communication device 100. The communication device communicator 331 may be, for example, a communication interface compliant with wired communication standards, such as Ethernet (registered trademark), or a communication interface compliant with wireless communication standards, such as the wireless LAN or Bluetooth (registered trademark). The communication device communicator 331 functions as communication device communication means.

The facility device communicator 332 is a communication interface for communication with the facility device 400. The facility device communicator 332 may be any communication interface that can establish communication with the facility device 400. Some facility management devices 300 can provide the facility devices 400 with support based on the types of the facility devices 400, and thus such facility management devices 300 include the facility device communicator 332 that can establish communication with the facility devices 400 to support. The facility management devices 300 that can provide the facility devices 400 with device type-based support are, for example, a facility management device 300 for an air conditioner designed for supporting the facility device 400 that is an air conditioner, and a facility management device 300 for lighting equipment designed for supporting the facility device 400 that is lighting equipment. The facility device communicator 332 is a communication interface that can establish communication with the facility device 400 to support. The facility device communicator 332 functions as facility device communication means.

Examples of the facility devices 400 include an air conditioner, lighting equipment, and fire prevention equipment that can transmit data to the facility management device 300. The facility devices 400 have any configuration except having means for transmitting data to the facility management device 300, and thus description of the functional configuration is omitted.

Figure 10:
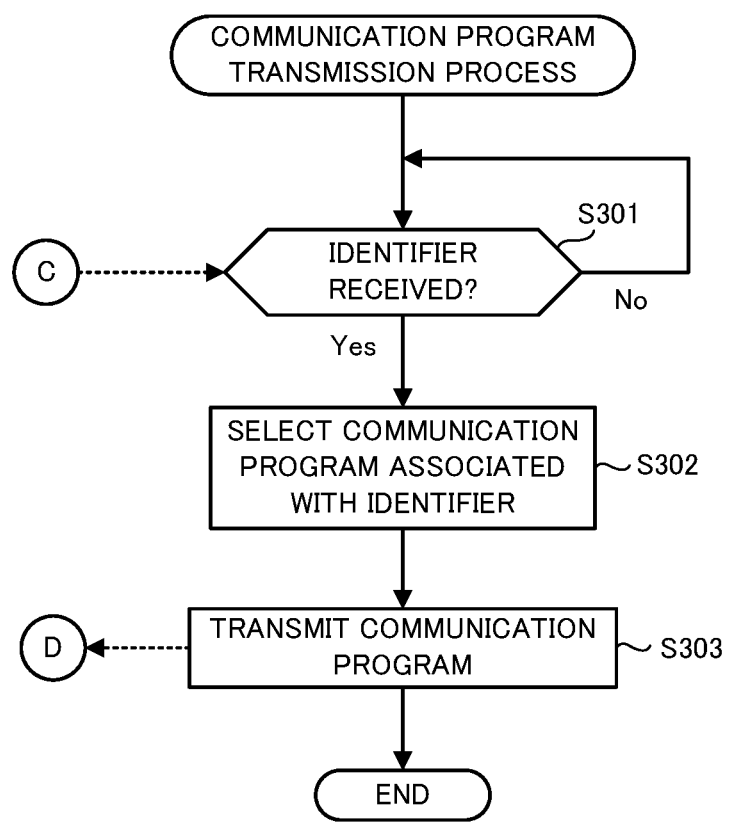
FIG. 10 is a flowchart of a communication program transmission process by the server according to Embodiment 1.

Next, a process for downloading the communication program adapted to the facility management device 300 as a preparation of relaying by the communication device 100 of data communication between the facility management device 300 and the server 200 is described step by step with reference to the flowcharts of FIGS. 8 to 10. This process includes three sub-processes that are a communication program acquisition process (FIG. 8) by the communication device 100, an identifier transmission process (FIG. 9) by the facility management device 300, and a communication program transmission process (FIG. 10) by the server 200. For ease of understanding, these three processes are described on a time-series basis. Due to this time-series based description, the flowcharts to be described change as transmission and reception of information occurs. Thus changed portions in the flowcharts are indicated alongside by dotted arrows and alphabetical letters A to D. The alphabetical letters indicate destinations in the flowcharts.

Upon startup of the facility management device 300, the identifier transmission process by the facility management device 300 starts as tasks that are independent of other tasks of the facility management device 300, and is placed into a wait state in which the facility management device 300 waits for receiving a request for an identifier from the communication device 100 (Step S201 in FIG. 9). Upon startup of the server 200, the communication program transmission process by the server 200 starts as a task independent of other tasks of the server 200, and is placed into a wait state in which the server 200 waits for the identifier to be transmitted by the communication device 100 (Step S301 in FIG. 10). The communication program acquisition process by the communication device 100 starts upon startup of the communication device 100 or upon a user instruction to the communication device 100.

First, as illustrated in FIG. 8, the identifier acquirer 111 of the communication device 100 transmits an identifier request packet to the facility management device 300 via the first communicator 131 (Step S101, A). The identifier request packet is a packet for acquiring a file on an identifier storage path of the facility management device 300 in HTTP.

As illustrated in FIG. 9, upon start of the identifier transmission process, the controller 310 of the facility management device 300 continuously determines whether the facility management device 300 has received the identifier request packet from the communication device 100 (Step S201, A). When a determination is made that the facility management device 300 has not received the identifier request packet (No in Step S201), the flow returns to Step S201, and the facility management device 300 continuously waits for the identifier request packet to be transmitted by the communication device 100. When a determination is made that the facility management device 300 has received the identifier request packet (Yes in Step S201), the device identifier transmitter 311 transmits to the communication device 100 via the communication device communicator 331 an identifier stored in the identifier storage 321 (Step S202, B). Specifically, the device identifier transmitter 311 transmits a file on the identifier storage path in accordance with the identifier request packet. Then the controller 310 ends the identifier transmission process.

After the facility management device 300 transmits the identifier, the identifier acquirer 111 of the communication device 100 acquires the identifier via the first communicator 131 (Step S102, B), as illustrated in FIG. 8. Step S102 is also referred to as an identifier acquisition step. The identifier transmitter 112 transmits to the server 200 via the second communicator 132 the identifier acquired by the identifier acquirer 111 (Step S103, C). Step S103 is also referred to as an identifier transmission step.

As illustrated in FIG. 10, upon start of the communication program transmission process, the identifier receiver 211 of the server 200 continuously determines whether the server 200 has received the identifier from the communication device 100 (Step S301, C). When a determination is made that the identifier receiver 211 has not received the identifier (Step S301, No), the flow returns to Step S301, and the server 200 continuously waits for the identifier to be transmitted by the communication device 100.

When a determination is made that the identifier receiver 211 has received the identifier (Yes in Step S301), the communication program selector 212 selects, with reference to the communication program library 221, the communication program associated with the identifier received by the identifier receiver 211 (Step S302). Then the communication program transmitter 213 transmits to the communication device 100 via the communicator 231 the communication program selected by the communication program selector 212 (Step S303, D). The controller 210 ends the communication program transmission process.

After the server 200 transmits the communication program, as illustrated in FIG. 8, the communication program acquirer 113 of the communication device 100 acquires the communication program via the second communicator 132 and stores the acquired communication program in the execution communication program storage 121 (Step S104, D). Step S104 is also referred to as a communication program acquisition step. The controller 110 ends the communication program acquisition process.

Through the steps, the communication device 100 can download the communication program adapted to the facility management device 300 to use the communication program for relaying data communication between the server 200 and the facility management device 300. After the downloading, the communication program executor 114 executes the communication program stored in the execution communication program storage 121, which allows the communication device 100 to relay data communication between the server 200 and the facility management device 300.

Figure 11:
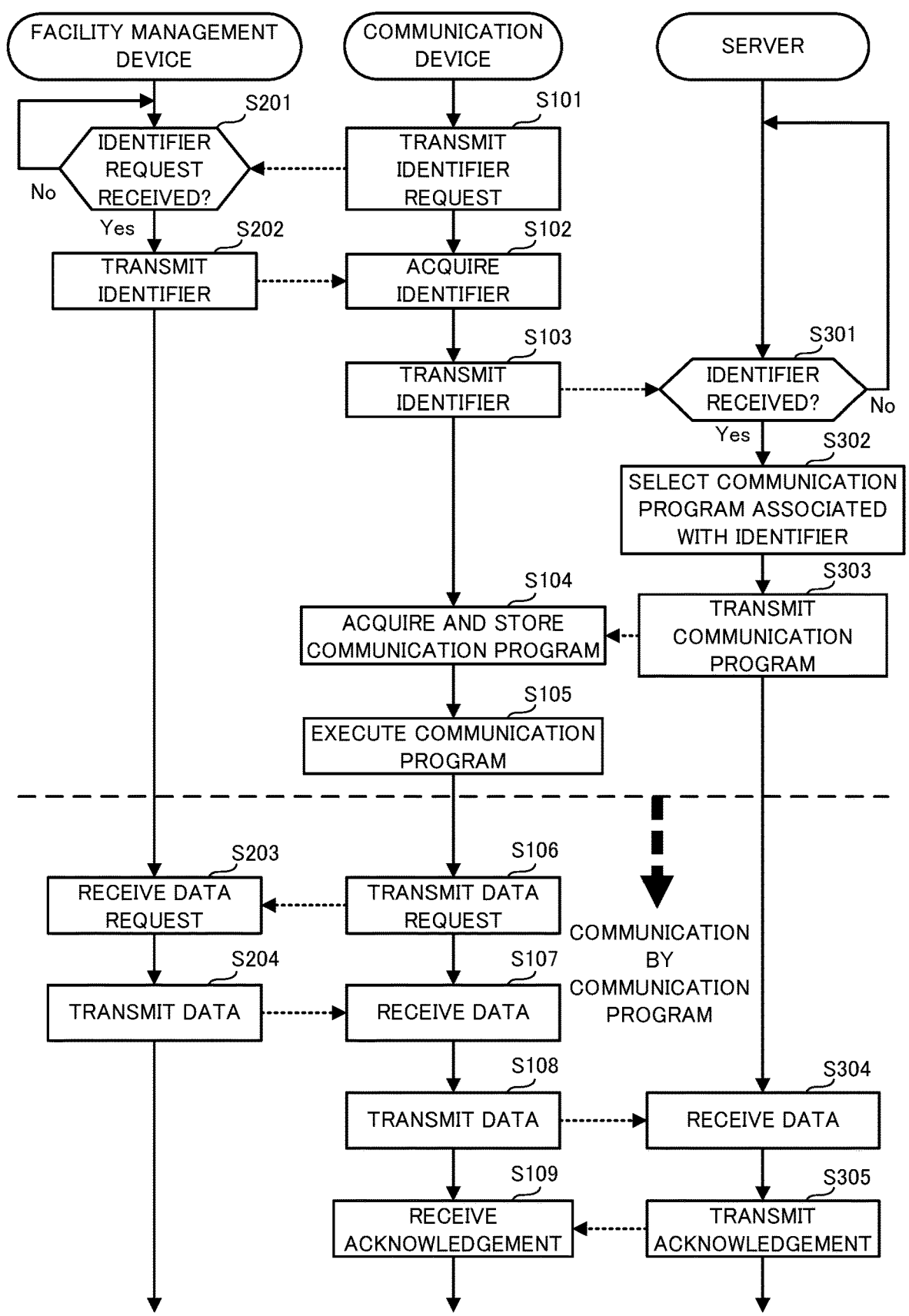
FIG. 11 is a communication sequence diagram illustrating a communication procedure among the communication device, the facility management device, and the server according to Embodiment 1.

An example of data communication by the communication program is described with reference to FIG. 11. Since Step S104 and the preceding steps in FIG. 11 are the same as described above, description of the process is started from Step S105.

The communication program executor 114 of the communication device 100 starts execution of the communication program stored in the execution communication program storage 121 (Step S105). Step S105 is also referred to as a communication program execution step. The process following Step S105 depends on the communication program, and thus the following process is just an example.

First, the communication device 100 transmits a data request packet to the facility management device 300 (Step S106). The data request packet is a packet for requesting the facility management device 300 to transmit data. Upon the facility management device 300 receiving the data request packet from the communication device 100 (Step S203), the data transmitter 313 transmits to the communication device 100 via the communication device communicator 331 the data stored in the data recorder 322 (Step S204). Upon receiving the data from the facility management device 300 (Step S107), the communication device 100 transmits the received data to the server 200 (Step S108). Upon receiving the data from the communication device 100 (Step S304), the server 200 transmits to the communication device 100 an acknowledgement packet that indicates successful reception of the data (Step S305). The subsequent steps follow the same or similar flow, and the communication device 100 relays communication between the facility management device 300 and the server 200 by the communication program.

As described above, the communication device 100 can relay communication between the facility management device 300 and the server 200 by the communication program executed by the communication program executor 114. When the communication device 100 is connected to another facility management device 300, the communication device 100 can acquire from the server 200 the communication program adapted to the facility management device 300 and execute the acquired communication program. This eliminates the need for a user to change the communication program for each facility management device 300 as his or her task.

Embodiment 2

In Embodiment 1, the server 200 includes the communication program library 221, and thus the communication device 100 can acquire various types of communication programs from the server 200. However, when the number of types of the facility management devices 300 to which the communication device is to connect is limited to a small number, the number of types of the communication programs is also limited to a small number. In such a case, the communication device can be provided with a communication program library. Embodiment 2 with such a configuration is described.

Figure 12:
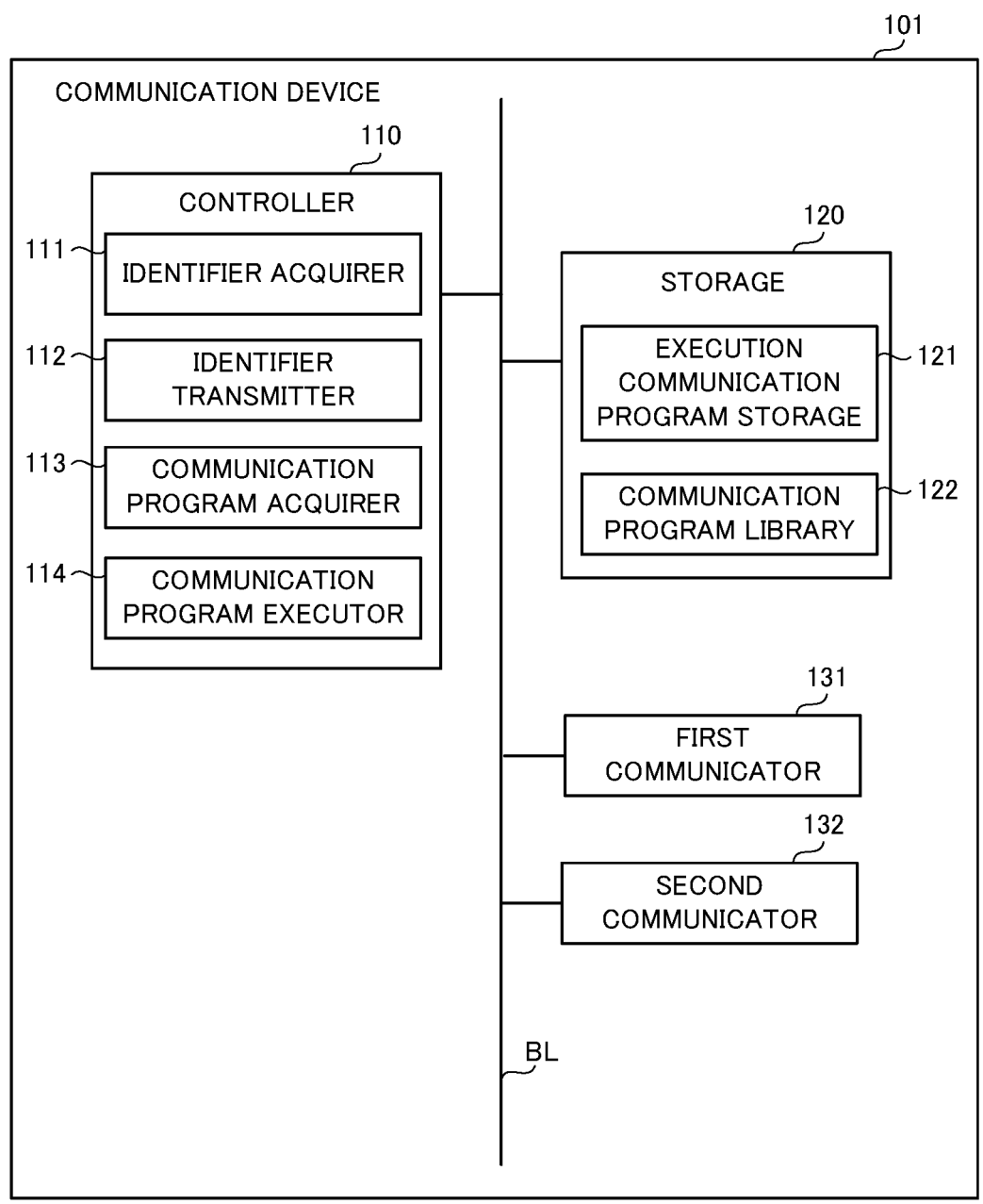
FIG. 12 is a functional block diagram of the communication device according to Embodiment 2 of the present disclosure.

As illustrated in FIG. 12, a communication device 101 according to Embodiment 2 has the same configuration as the communication device 100 according to Embodiment 1 except that the storage 120 includes a communication program library 122. Similarly to the communication program library 221 (FIG. 4) of the server 200 in Embodiment 1, the communication program library 122 stores, on an identifier basis, multiple communication programs each adapted to the facility management device 300 that is identified with the identifier, with each communication program associated with the identifier. Desirably, similarly to the communication program library 221 of the server 200 of Embodiment 1, upon a new customer purchasing the facility management device 300, the communication program adapted to the facility management device 300 purchased by the new customer is additionally stored in the communication program library 122 in association with the identifier of the corresponding facility management device 300. The communication program library 122 may be updated by periodic downloading of the communication program library 221 from the server 200.

Figure 13:
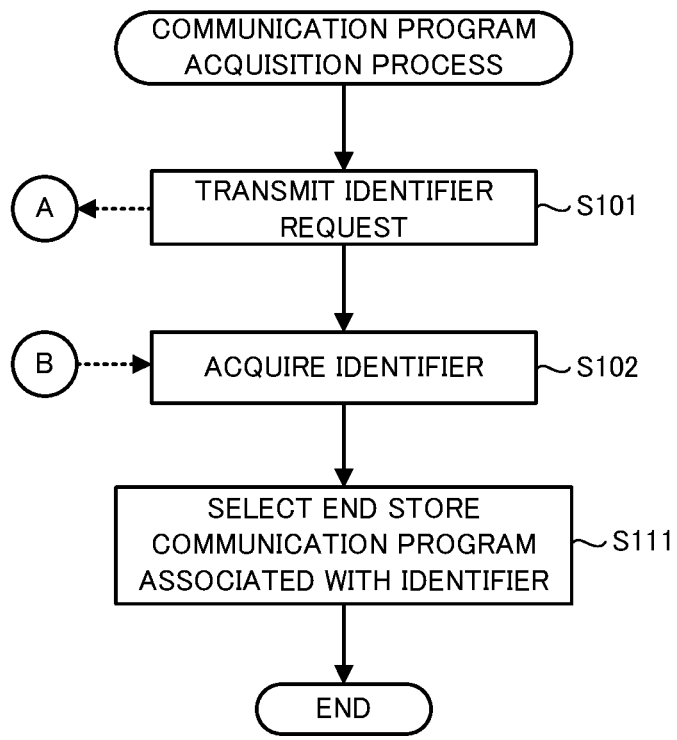
FIG. 13 is a flowchart of a communication program acquisition process by the communication device according to Embodiment 2.

A communication program acquisition process by the communication device 101 is, as illustrated in FIG. 13, the same as the communication program acquisition process by the communication device 100 described with reference to FIG. 8 except that Step S103 and the subsequent step are replaced with Step S111.

In Step S111, the communication program acquirer 113 selects from the communication program library 122 a communication program corresponding to the identifier acquired by the identifier acquirer 111 in Step S102, and stores the selected communication program in the execution communication program storage 121. Except for Step S111, the communication program acquisition process is the same as that of Embodiment 1.

The communication device 101 according to Embodiment 2 can execute the communication program adapted to the facility management device 300 without connecting the server 200, and thus collect and confirm transmission data from various facility management devices 300 even under circumstances where the communication device 100 is unable to communicate with the server 200. Thus a user can provide maintenance services of multiple facility management devices 300 using only a single communication device 101.

Any combination of the above-described embodiments can be adopted. For example, combination of Embodiment 1 with Embodiment 2 enables acquisition of the communication program from the communication program library 221 of the server 200 when the communication program corresponding to the identifier is not stored in the communication program library 122 of the communication device 101.

Figure 14:
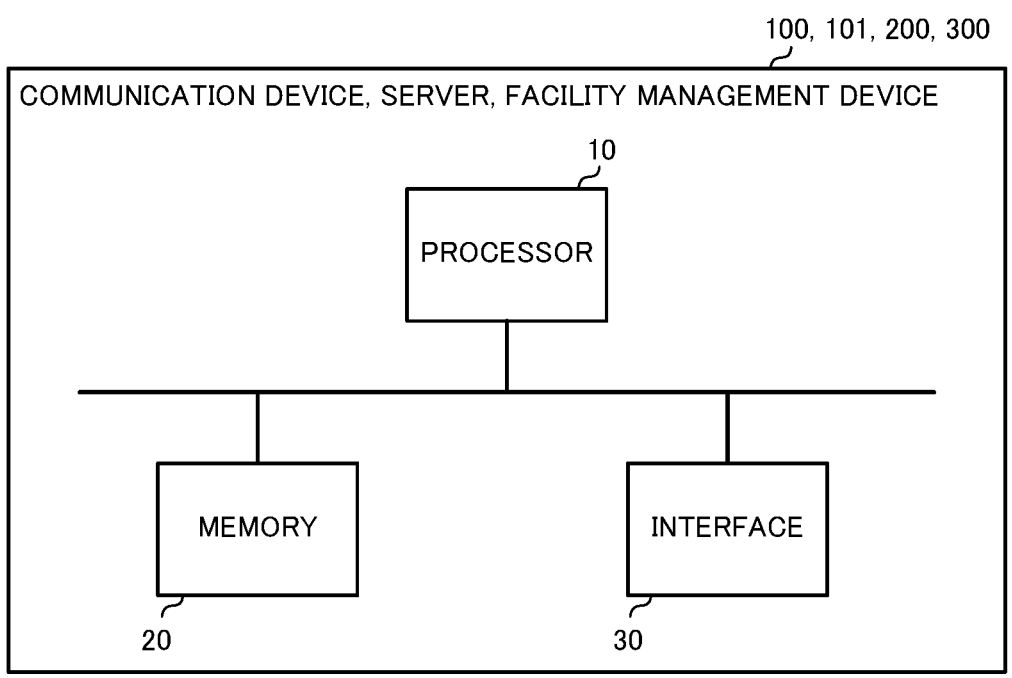
FIG. 14 is an example hardware configuration of the communication device, the server, and the facility management device according to the present disclosure.

The communication devices 100 and 101, the server 200, and the facility management device 300, which are hardware, according to the embodiments of the present disclosure each include a processor 10, a memory 20, and an interface 30, for example as illustrated in FIG. 14. Functions of the communication devices 100 and 101, the server 200, and the facility management device 300 are implemented by the processor 10 executing programs stored in the memory 20. The interface 30 is for establishing connection and communication among the communication devices 100 and 101, the server 200, and the facility management device 300, and may include multiple types of interfaces as necessary. FIG. 14 illustrates an example including a single processor 10 and a single memory 20, but multiple processors and multiple memories may execute the above functions in cooperation with one another.

In any of the above embodiments, each function can be implemented on a general computer. Specifically, the above embodiments are described as the programs to be executed by the controllers 110, 210, and 310 being stored beforehand in the storage 120, 220, and 320. However, the program can be distributed in a form of a computer-readable recording medium storing the program, such as a compact disc read only memory (CD-ROM), a digital versatile disc (DVD), and a magneto-optical disc (MO). The program may be installed in a computer to enable the computer to implement the above-described functions. When the above-described functions are implemented partly by an OS and application or in cooperation with the OS and the application, the program other than the OS may be stored on the recording medium.

In addition, each program can be distributed via a communication network, with each program superimposed onto a carrier wave. For example, the program may be posted on a bulletin board system (BBS) on the communication network to be distributed via the network. A configuration may be modified to allow the above-described process to be executed by the program being started and executed under control of the OS similarly to other application programs being executed.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

10 Processor
20 Memory
30 Interface
100, 101 Communication device
110, 210, 310 Controller
111 Identifier acquirer
112 Identifier transmitter
113 Communication program acquirer
114 Communication program executor
120, 220, 320 Storage
121 Execution communication program storage
122, 221 Communication program library
131 First communicator
132 Second communicator
200 Server
211 Identifier receiver
212 Communication program selector
213 Communication program transmitter
231 Communicator
300 Facility management device
311 Device identifier transmitter
312 Data acquirer
313 Data transmitter
321 Identifier storage
322 Data recorder
331 Communication device communicator
332 Facility device communicator
400 Facility device
500 Network
1000 Communication system
BL Bus line

The invention claimed is:

1. A communication device comprising:
a communication interface configured to communicate via wireless or wired communication with a device;
a central processing unit; and
a storage configured to store a communication program library in which a plurality of communication programs are stored, each communication program of the plurality of communication programs being adapted to a corresponding device of a plurality of devices, each communication program being stored in association with an identifier that identifies the corresponding device;
the central processing unit being configured to
acquire, from the device via the communication interface, the identifier that identifies the device;
acquire, from the communication program library, a communication program of the plurality of communication programs which is associated with the identifier acquired by the central processing unit; and
execute the communication program acquired by the central processing unit,
wherein the communication program library stores, in association with the identifier that identifies the device, a content of contract with a customer who is a purchaser of the device and the communication program adapted to the content of contract, and
wherein the central processing unit acquires the communication program by selecting from the communication program library the communication program which is adapted to the content of contract associated with the identifier acquired by the central processing unit.

2. A server comprising:
a communication interface configured to communicate via wireless or wired communication with a communication device;
a central processing unit; and
a storage configured to store a communication program library in which communication programs are stored, each communication program of the communication programs being adapted to a device connected to the communication device, each communication program being stored in association with an identifier that identifies the device;
the central processing unit being configured to
receive the identifier from the communication device via the communication interface;
select, from the communication program library, a communication program associated with the identifier received by the central processing unit; and
transmit to the communication device the communication program selected by the central processing unit,
wherein the communication program library stores, in association with the identifier that identifies the device, a content of contract with a customer who is a purchaser of the device and the communication program adapted to the content of contract, and
wherein the central processing unit selects from the communication program library a communication program adapted to the content of contract associated with the identifier received by the central processing unit.

3. A communication system comprising:
a server; and
a communication device,
wherein the server includes
a server central processing unit; and
a storage configured to store a communication program library in which communication programs are stored, each communication program of the communication programs being adapted to a device connected to the communication device, each communication program being stored in association with an identifier that identifies the device;
the server central processing unit being configured to
receive the identifier from the communication device,
select, from the communication program library, a communication program associated with the identifier received by the server central processing unit, and
transmit to the communication device the communication program selected by the server central processing unit,
wherein the communication program library stores, in association with the identifier that identifies the device, a content of contract with a customer who is a purchaser of the device and the communication program adapted to the content of contract,
wherein the server central processing unit selects from the communication program library a communication program adapted to the content of contract associated with the identifier received by the server central processing unit,
wherein the communication device includes a communication device central processing unit configured to
acquire the identifier from the device by communication, acquire, from the server by communication, the communication program associated with the identifier acquired by the communication device central processing unit, and execute the communication program acquired by the communication device central processing unit.

4. A communication method comprising:

an identifier acquisition step of acquiring, from a device by communication, an identifier for identifying the device;

a communication program acquisition step of acquiring, from a communication program library, a communication program associated with the identifier acquired in the identifier acquisition step, wherein the communication program library is a library in which communication programs that are each adapted to the corresponding device are stored, each in association with the identifier for identifying the device; and a communication program execution step of executing the communication program acquired in the communication program acquisition step, wherein the communication program library stores, in association with the identifier for identifying the device, a content of contract with a customer who is a purchaser of the device and the communication program adapted to the content of contract, and wherein the communication program acquisition step includes acquiring the communication program by selecting from the communication program library a communication program adapted to the content of contract associated with the identifier acquired in the identifier acquisition step.

5. A non-transitory computer-readable recording medium storing a program for causing a computer to execute:

an identifier acquisition step of acquiring, from a device by communication, an identifier for identifying the device; and a communication program acquisition step of acquiring, from a communication program library, a communication program associated with the identifier acquired in the identifier acquisition step, wherein the communication program library is a library in which communication programs that are each adapted to the corresponding device are stored, each in association with the identifier for identifying the device, wherein the communication program library stores, in association with the identifier for identifying the device, a content of contract with a customer who is a purchaser of the device and the communication program adapted to the content of contract, and wherein the communication program acquisition step includes acquiring the communication program by selecting from the communication program library a communication program adapted to the content of contract associated with the identifier acquired in the identifier acquisition step.

\* \* \* \* \*